US012590806B2

(12) United States Patent
Forscher et al.

(10) Patent No.: US 12,590,806 B2
(45) Date of Patent: Mar. 31, 2026

(54) SYSTEM-LEVEL OPTIMIZATION AND MODE SUGGESTION PLATFORM FOR TRANSPORTATION TRIPS

(71) Applicant: GM CRUISE HOLDINGS LLC, San Francisco, CA (US)

(72) Inventors: Edward Henry Forscher, Oakland, CA (US); Alexander John Bowe, San Francisco, CA (US); Kelan Stoy, Albany, CA (US); Jacob Nathan Yunis, Brooklyn, NY (US); Mamoon Masud, Austin, TX (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 159 days.

(21) Appl. No.: 18/357,578

(22) Filed: Jul. 24, 2023

(65) Prior Publication Data

US 2025/0035450 A1 Jan. 30, 2025

(51) Int. Cl.
*G01C 21/34* (2006.01)
*B60W 60/00* (2020.01)
*G08G 1/00* (2006.01)

(52) U.S. Cl.
CPC ... *G01C 21/3423* (2013.01); *B60W 60/00253* (2020.02); *G01C 21/3446* (2013.01); *G08G 1/202* (2013.01)

(58) Field of Classification Search
None
See application file for complete search history.

(56) References Cited

U.S. PATENT DOCUMENTS

| | | | | |
|---|---|---|---|---|
| 11,940,286 B1 * | 3/2024 | O'Neil | ............ | G06Q 10/08355 |
| 2017/0191845 A1 * | 7/2017 | Marueli | ................. | H04L 67/12 |

(Continued)

FOREIGN PATENT DOCUMENTS

| | | | | | |
|---|---|---|---|---|---|
| CN | 109215341 A | * | 1/2019 | ........... | G08G 1/0137 |
| EP | 3355028 A1 | * | 8/2018 | ............. | G08G 1/202 |
| JP | 2008116320 A | * | 5/2008 | | |

OTHER PUBLICATIONS

Alessio Pagani, Francesco Bruschi, Vincenzo Rana and Marcello Restelli, User Context Estimation for Public Travel Assistance and Intelligent Service Scheduling, 2017 IEEE 20th International Conference on Intelligent Transportation Systems (Year: 2017).*

(Continued)

*Primary Examiner* — Khoi H Tran
*Assistant Examiner* — Dairon Estevez
(74) *Attorney, Agent, or Firm* — Honigman LLP; Matthew H. Szalach; Jonathan P. O'Brien

(57) ABSTRACT

Disclosed are embodiments for facilitating a system-level optimization route and mode suggestion platform for transportation trips. In some aspects, an embodiment includes receiving identification of an origin (O) location and a destination (D) location of an O/D pair corresponding to a transportation trip request of a user; determining N pickup (PU) locations for the O location and N drop-off (DO) locations for the D location; determining an origin walk duration between each N PU locations and the O location and a destination walk duration between each N DO locations and the D location; routing between the N PU locations and the N DO locations to determine an estimate of in-vehicle time for each route; and selecting a route that minimizes a route score, wherein the route score is based on a sum of the origin walk duration, the in-vehicle time, and the destination walk duration.

20 Claims, 6 Drawing Sheets

200

Receive identification of an origin (O) and destination (D) location pair (O/D pair) corresponding to a transportation trip request
210

Determine N pickup (PU) locations and N dropoff (DO) locations for the respective O location and D location of the O/D pair
220

Determine origin walk duration between each N PU locations and the O location and destination walk duration between each N DO locations and the D location
230

Route between all N PU locations and all N DO locations and determine an estimate of in-vehicle time for each route
240

Select a route that minimizes a route score, the route score is based on a sum of the origin walk duration, the in-vehicle time, and destination walk duration
250

(56) References Cited

U.S. PATENT DOCUMENTS

| | | | | |
|---|---|---|---|---|
| 2019/0120640 A1* | 4/2019 | Ho | .................... | G01C 21/3453 |
| 2020/0167702 A1* | 5/2020 | Beaurepaire | ....... | G01C 21/3438 |
| 2020/0378771 A1* | 12/2020 | Beaurepaire | ....... | G06Q 30/0284 |
| 2021/0035450 A1* | 2/2021 | Gao | ................ | G08G 1/096844 |
| 2021/0095979 A1* | 4/2021 | Weinstein | .......... | G01C 21/3438 |
| 2021/0108929 A1* | 4/2021 | Zhang | ............... | G01C 21/3438 |
| 2021/0142248 A1* | 5/2021 | Balva | .................... | G08G 1/202 |

OTHER PUBLICATIONS

Vincent T.F. Chow, Ka Wing Sung, Helen M. Meng, Ka Ho Wong, Gary KS Leung, Yong-Hong Kuo and Kelvin K.F. Tsoi, Utilizing Real-Time Travel Information, Mobile Applications and Wearable Devices for Smart Public Transportation, 2016 7th International Conference on Cloud Computing and Big Data (Year: 2016).*
Xin Li, Sangen Hu, Wenbo Fan, Kai Deng, Modeling an enhanced ridesharing system with meet points and time windows, May 2018, Plos One (Year: 2018).*

\* cited by examiner

200

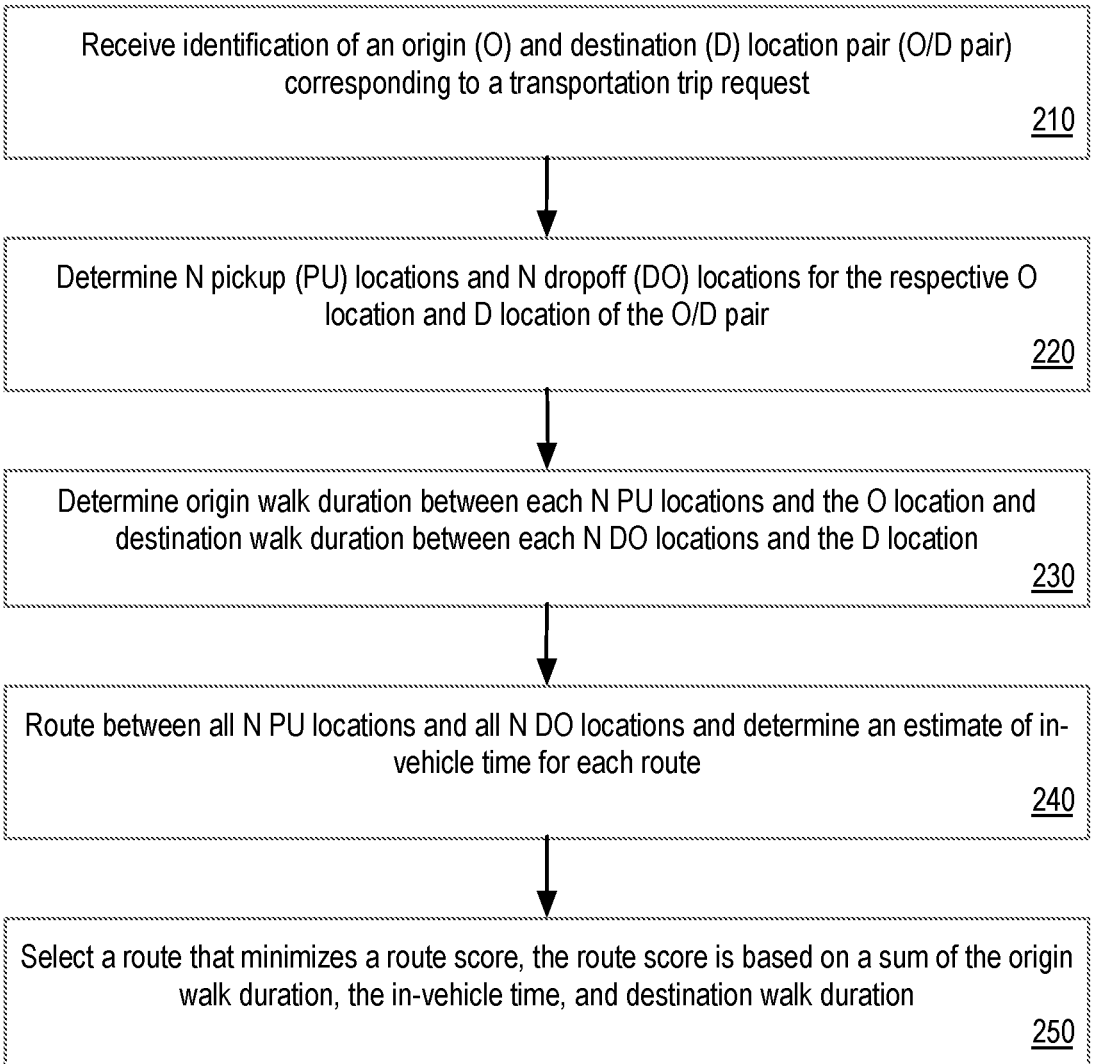

Receive identification of an origin (O) and destination (D) location pair (O/D pair) corresponding to a transportation trip request

210

Determine N pickup (PU) locations and N dropoff (DO) locations for the respective O location and D location of the O/D pair

220

Determine origin walk duration between each N PU locations and the O location and destination walk duration between each N DO locations and the D location

230

Route between all N PU locations and all N DO locations and determine an estimate of in-vehicle time for each route

240

Select a route that minimizes a route score, the route score is based on a sum of the origin walk duration, the in-vehicle time, and destination walk duration

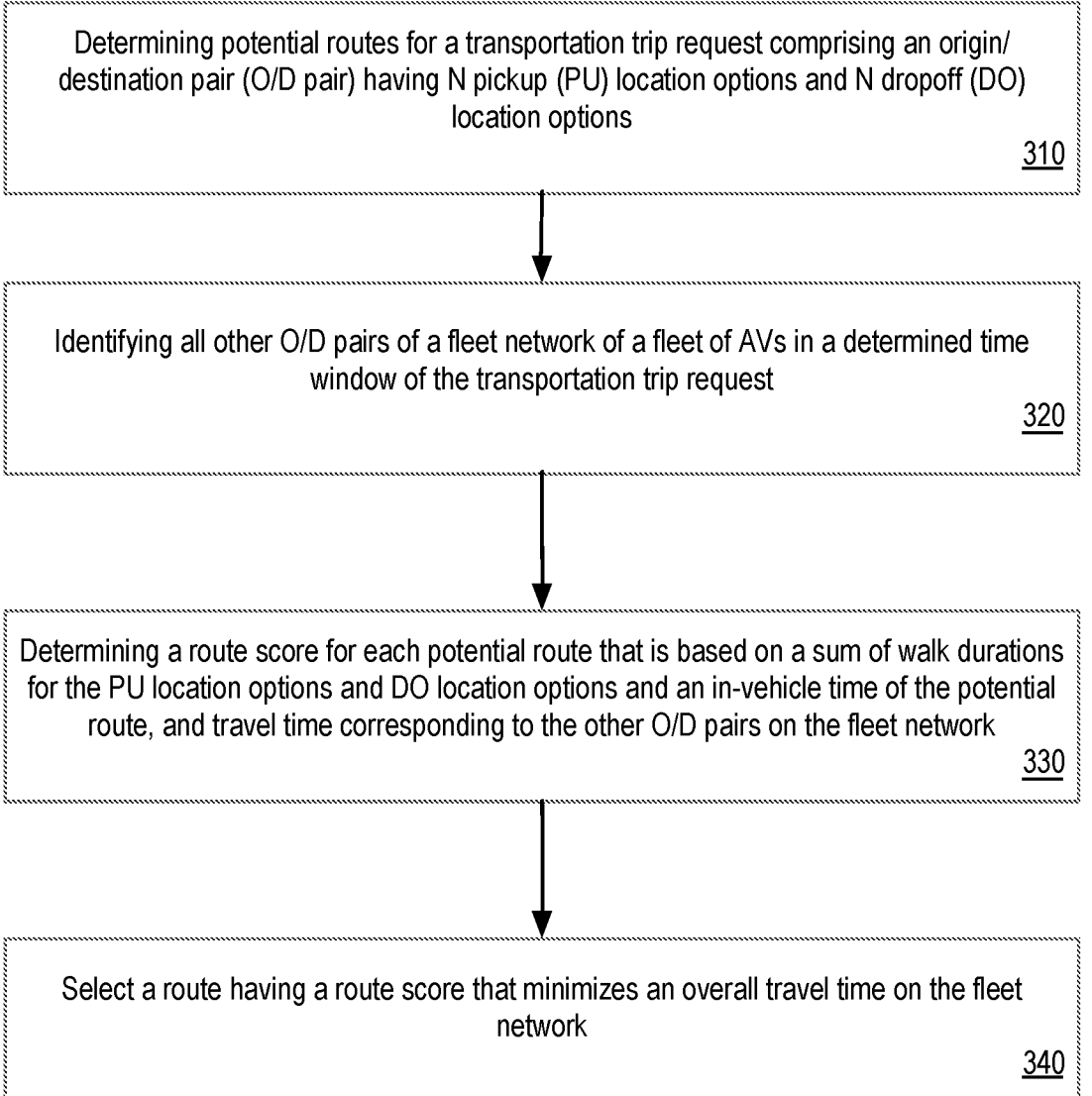

Determining potential routes for a transportation trip request comprising an origin/destination pair (O/D pair) having N pickup (PU) location options and N dropoff (DO) location options

310

Identifying all other O/D pairs of a fleet network of a fleet of AVs in a determined time window of the transportation trip request

320

Determining a route score for each potential route that is based on a sum of walk durations for the PU location options and DO location options and an in-vehicle time of the potential route, and travel time corresponding to the other O/D pairs on the fleet network

330

Select a route having a route score that minimizes an overall travel time on the fleet network

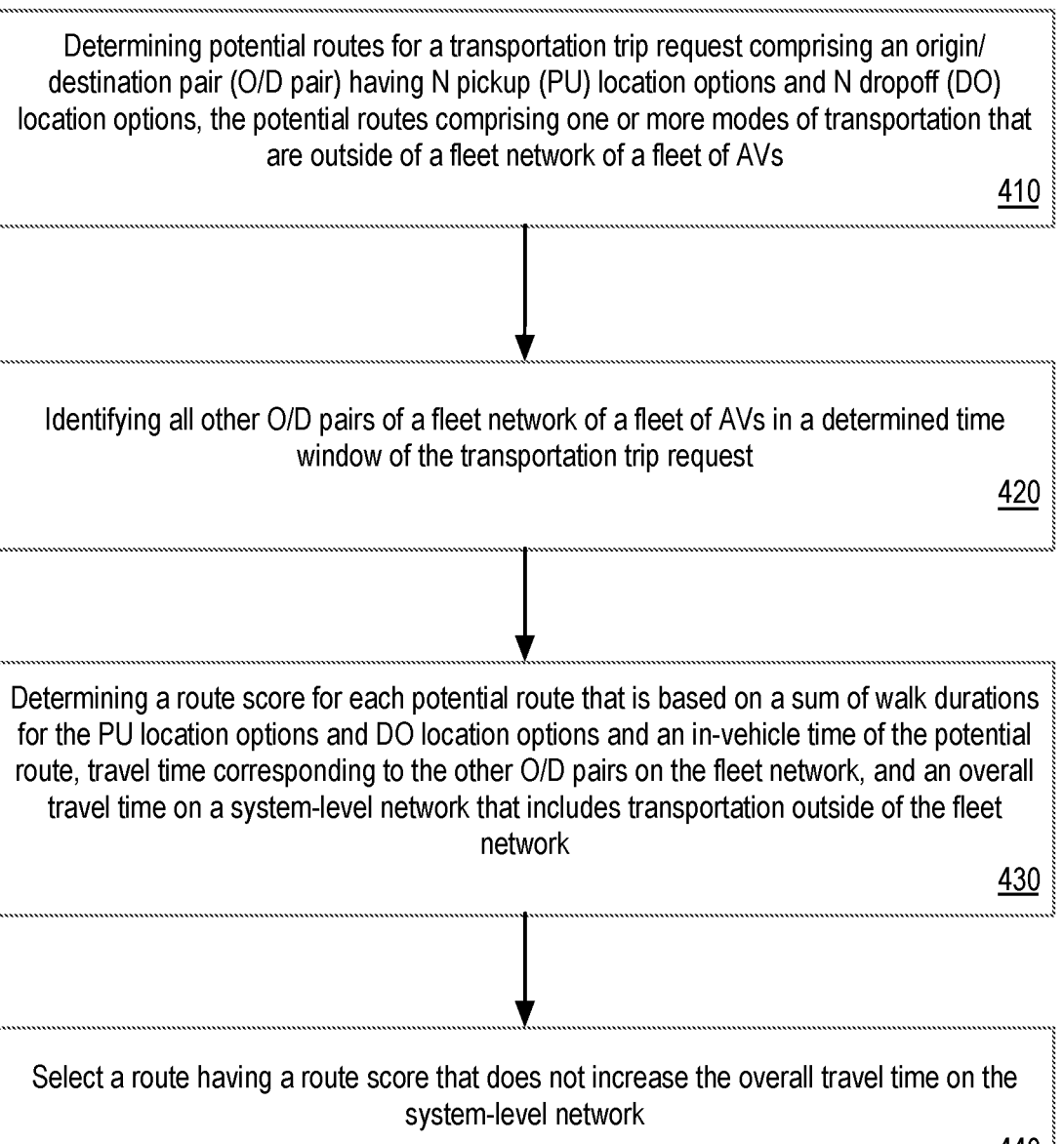

Determining potential routes for a transportation trip request comprising an origin/ destination pair (O/D pair) having N pickup (PU) location options and N dropoff (DO) location options, the potential routes comprising one or more modes of transportation that are outside of a fleet network of a fleet of AVs

410

Identifying all other O/D pairs of a fleet network of a fleet of AVs in a determined time window of the transportation trip request

420

Determining a route score for each potential route that is based on a sum of walk durations for the PU location options and DO location options and an in-vehicle time of the potential route, travel time corresponding to the other O/D pairs on the fleet network, and an overall travel time on a system-level network that includes transportation outside of the fleet network

430

Select a route having a route score that does not increase the overall travel time on the system-level network

SYSTEM-LEVEL OPTIMIZATION AND MODE SUGGESTION PLATFORM FOR TRANSPORTATION TRIPS

BACKGROUND

1. Technical Field

The disclosure generally relates to the field of processing systems and, more specifically, to a system-level optimization route and mode suggestion platform for transportation trips.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific embodiments illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 2 illustrates an example method implementing single route optimization for transportation trips, in accordance with embodiments herein;

FIG. 3 illustrates an example method for implementing fleet-wide route optimization for transportation trips;

FIG. 4 illustrates an example method for implementing system-wide route optimization for transportation trips, in accordance with embodiments herein;

DETAILED DESCRIPTION

Figure 1:
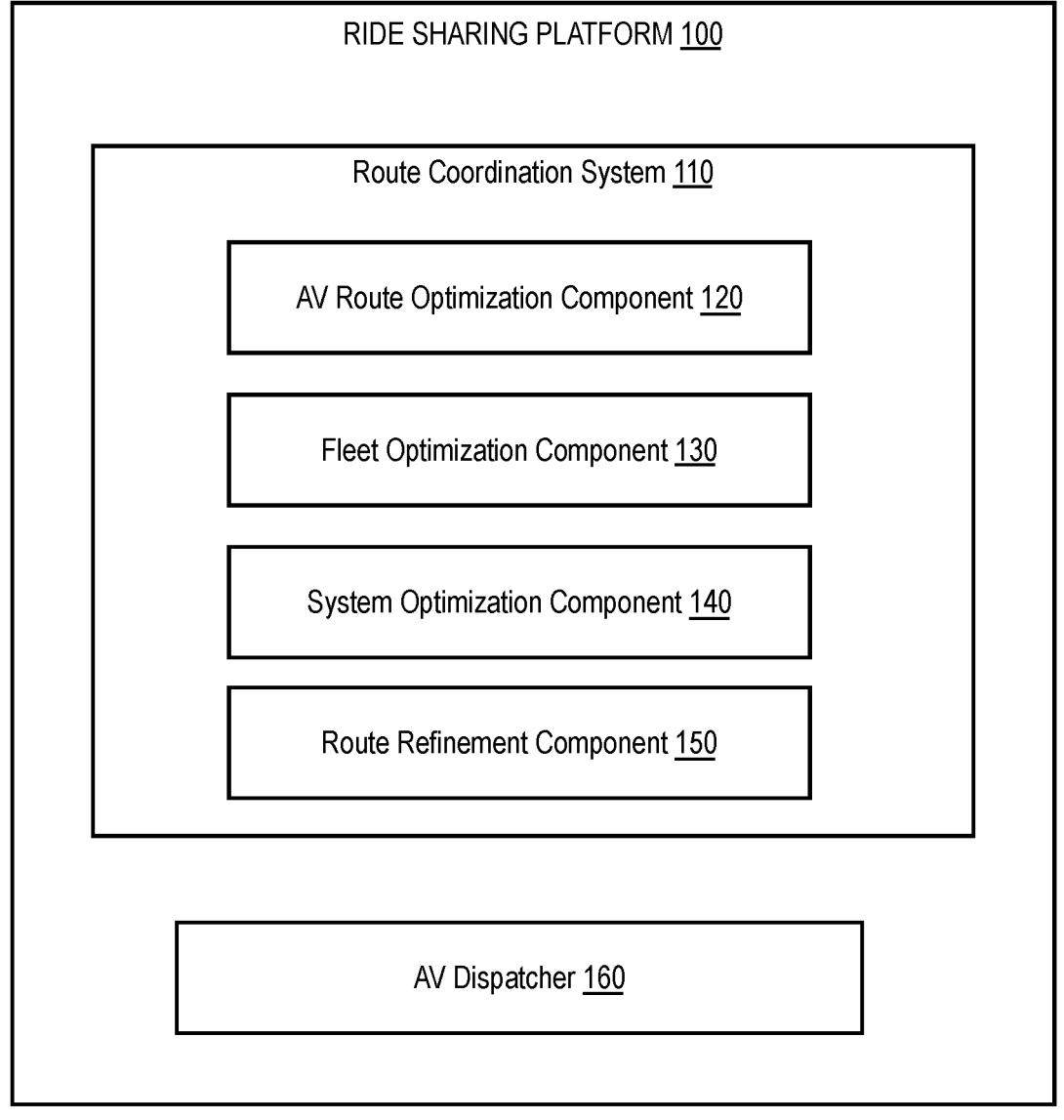
FIG. 1 is a block diagram of a detailed view of an example ride sharing platform providing for system-level optimization route and mode suggestion for transportation trips, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the disclosure is the gathering and use of data available from various sources to improve quality and experience. The disclosure contemplates that in some instances, this gathered data may include personal information. The disclosure contemplates that the entities involved with such personal information respect and value privacy policies and practices.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

The collection and maintenance of high accuracy map data and user preference data are utilized for the navigation and routing functions performed by AVs. Some AV routing and navigations functions take consideration of routing possibilities indicated by connected map locations (e.g., availability of navigable roadways between map locations). However, such routing functions do not consider the capabilities of the AV, user preferences, or risk-ware routing considerations. For example, when a user (e.g., customer) requests a transportation trip, the route planning methodologies greedily optimize the user's travel time. Greedy optimization refers to optimizing the user's individual trip separate from other user's trips, rather than assessing the system network as a whole. In some cases, this can lead to suboptimal outcomes for the overall system, where more total time may be spent in traffic and/or more emissions and externalities may be created.

Moreover, in some approaches, the AV pickup and drop-off locations corresponding to a user's indicated origin and destination points may be "snapped" to the nearest location. A proximity of the user to the "snapped" location is calculated using, for example, a Manhattan distance, which only approximates the user's walking distance to the pickup location. This can result in selecting pickup locations and/or drop-off locations that may take more effort for the user to reach than other alternative pickup/drop-off locations. Furthermore, the selected pickup location can influence (negatively or positively) the quality and/or difficulty of the vehicle route planned for the user.

In order to improve optimization of routes for transportation trips both for individual users and on a system-wide level, embodiments herein provide a system-level optimization route and mode suggestion platform for transportation trips. The system-level optimization route and mode suggestion platform for transportation trips of embodiments can optimize route planning of transportation trips for self-driving car services, such as taxi or ride-hailing (e.g., ridesharing) services. For example, system-level optimization route and mode suggestion platform can implement techniques to minimize the total travel time for a user both on an individual trip basis and/or across an aggregation of transportation trips on a fleet or system-wide basis.

In one embodiment, the system-level optimization route and mode suggestion platform can optimize transportation trips on an individual user basis, also referred to herein as single route optimization. In one embodiment, the system-level optimization route and mode suggestion platform can further scale up the single route optimization of transportation trips to optimize the transportation trip on a fleet-wide basis (e.g., reduce overall travel time on the fleet's network of AVs). Furthermore, the system-level optimization route and mode suggestion platform can expand the scope of the fleet-wide optimization to an entire system network of transportation (e.g., all transportation including the fleet network of AVs as well as other modes of transportation external to the fleet network). In addition, the system-level optimization route and mode suggestion platform can dynamically adjust route optimizations while a transportation trip is en route to continuously minimize travel time (e.g., on an individual basis and/or fleet or system-wide basis).

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discussed embodiments as implemented in an automotive environment, but one skilled in the art will appreciate that embodiments may be implemented in a variety of different environments and use cases. Further details of the system-level optimization route and mode suggestion platform for transportation trips of embodiments herein are further described below with respect to FIGS. 1-6.

FIG. 1 is a block diagram of a detailed view of an example ride sharing platform 100 providing for system-level optimization route and mode suggestion for transportation trips, in accordance with embodiments herein. In one embodiment, ride sharing platform 100 can be, for example, part of a data center that is cloud-based or otherwise. In other examples, the ride sharing platform 100 can be part of an AV or a human-operated vehicle having an advanced driver assistance system (ADAS) that can utilize various sensors including radar sensors.

In one embodiment, the ride sharing platform 100 is part of a system that can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, ride sharing platform 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

The system hosting ride sharing platform 100 may be part of a data center for managing a fleet of AVs and AV-related services. The data center can send and receive various signals to and from an AV. These signals can include sensor data captured by the sensor systems of the AV, roadside assistance requests, software updates, ridesharing pick-up and drop-off instructions, and so forth. In some examples, the ride sharing platform 100 may be hosted in a data center that may also support a ridesharing service, a delivery service, a remote/roadside assistance service, street services (e.g., street mapping, street patrol, street cleaning, street metering, parking reservation, etc.), and the like. In some embodiments, the ride sharing platform 100 may be implemented in the AV itself or may be implemented in a server computing device.

In some embodiments, the ride sharing platform 100 is utilized to provide a system-level optimization route and mode suggestion platform for transportation trips. In embodiments herein, the ride sharing platform 100 can include a route coordination system 110 and an AV dispatcher 160 to enable the system-level optimization route and mode suggestion platform for transportation trips discussed herein. In some embodiments, the route coordination system 110 may implement various techniques and methodologies to optimize transportation trip routes on an individual basis and/or fleet or system-wide basis.

In embodiments herein, the ride sharing platform 100 can optimize route planning of transportation trips for self-driving car services, such as taxi or ride-hailing (e.g., ridesharing) services. For example, the ride sharing platform 100 can implement techniques to minimize the total travel time for a user both on an individual trip basis and across an aggregation of transportation trips on a fleet or system-wide basis. The route coordination system 110 may include an AV route optimization component 120, a fleet optimization component 130, a system optimization component 140, and a route refinement component 150. The AV route optimization component 120 can optimize transportation trips on an individual user basis, also referred to herein as single route optimization. The fleet optimization component 130 can scale up the single route optimization of transportation trips to optimize the transportation trip on a fleet-wide basis (e.g., reduce overall travel time on the fleet's network of AVs). The system optimization component 140 can expand the scope of the fleet-wide optimization to an entire system network of transportation (e.g., all transportation including the fleet network of AVs as well as other modes of transportation external to the fleet network). The route refinement component 150 can dynamically adjust route optimizations while a transportation trip is en route to continuously minimize travel time (e.g., on an individual basis and/or fleet or system-wide basis).

With respect to the AV route optimization component 120, as noted above, this component 120 can optimize transportation trips on an individual user basis, also referred to herein as single route optimization. The single route optimization provided by the AV route optimization component 120 can select optimal routes for a transportation trip requested by a user, where the optimal route minimizes the sum of walking time of the user ("walking_time") and time in the vehicle ("in_vehicle_time") based on an Origin/ Destination (O/D) pair provided by the user.

Rather than selecting a geographically-closest reachable point(s) from the O/D pair for the AV to route to, the AV route optimization component 120 can identify N nearby points (i.e., pickup (PU) location and drop-off (DO) location) to each of O and D. In one embodiment, the N points are within a determined radius of the respective O and D locations and are identified as locations that the AV is capable of pulling over at. In one embodiment, N is a configurable parameter of the AV route optimization component 120, which may be determined manually or automatically (e.g., via artificial intelligence (AI)/machine learning (ML) model).

Once the N points are identified, the AV route optimization component 120 can compute the walking distance/time ("walking_time") and driving time (e.g., route estimated time of arrival (ETA)) ("in_vehicle_time") associated with each of the N points (also referred to herein as N locations). In one embodiment, routing between all of the N PU locations and all of the N DO locations can include taking a cartesian product of the N PU locations and the N DO locations in order to identify a set of all ordered pairs of the N PU location and the D DO locations. In some embodiments, a walking distance between the select N locations and the O/D locations is queried from, for example, a mapping service of the self-driving car service. In some embodiments, a default walking speed of the user may be utilized to estimate a walking duration. In other embodiments, the user may configure a personalized walking speed or a personal walking speed of the user may be inferred from past walking history of the user. Furthermore, in some embodiments, sensors of the AV may be utilized to infer a walking speed and/or ability of the user to establish the walking preferences of the user. For example, if a camera sensor of the AV determines that the user is utilizing walking assistance, such as crutches, a wheelchair, or carrying a heavy or cumbersome item(s), the preference for walking and/or the walking speed may be reduced for the user. In addition, such inferences may cause the radius or number of N points to be adjusted (e.g., a smaller radius or number of N points is set when the walking preference is lower for a user). In addition, an estimated distance and time for the in-vehicle driving portion of the route between the N PU and N DO locations is also queried from, for example, the mapping service of the self-driving car service.

In one embodiment, the AV route optimization component 120 may determine a route score for each route. The route score may be based on a sum of a first walk duration from the O location to the PU location (origin walk duration), the in-vehicle time, and a second walk duration from the DO location to the D location (destination walk duration). In some embodiments, additional factors may influence the route score including, but not limited to, number and difficulty of AV maneuvers to be taken during the route, one-way streets and heavy traffic streets on the route, safety of the PU/DO locations (e.g., based on lighting at the locations, crime statistics, etc.), time of day, weather, and/or user preference for walking, for example.

In some embodiments, PU and DO locations may be suggested that can help users hit health and/or movement targets for the day (e.g., counting steps for pickups). In another example, the self-driving car service may integrate with health insurance benefits to allow users to be credited when selecting health-conscious behaviors, such as additional walking on transportation trip routes. In some embodiments, the user may indicate a user preference for cost savings versus exercise/time savings. For example, the user can adjust to a preference that modifies the max radius from their current position, which can then be considered as part of the route score.

In one embodiment, a route can be selected based on the determined route scores. For example, a route associated with a lowest route score may be selected. In one embodiment, the selected route details, including the PU and DO locations associated with the selected N points, are provided to the user. In addition, the AV dispatcher 160 is invoked to cause an AV to navigate to the PU location for the requested transportation trip of the user. In embodiments herein, by ranking the routes (and associated AV PU and DO locations) in terms of walking distance and route duration, walking distance and estimated trip time can be improved for users of the self-driving car service. For example, a user walking 300 feet to a different location may significantly alter (and potentially improve) the overall trip time because it may move the user to a more favorable location for the AV to maneuver to and from. In another example, having a user walk around the block to a different spot may remove a difficult lane change AV maneuver, or reduce the total distance of the trip due to one-way streets, traffic, being on the wrong side of the street, and so on.

In some embodiments, the route refinement component 150 may continually re-assess the route optimization to determine if adjustments should be made to the route to minimize travel time. For example, as traffic changes on the route during the transportation trip, an early drop-off may be offered to the user at a new DO location in order to minimize the time to the D location. This extends the pre-trip optimization to also be re-computed on-trip to continuously minimize travel time. In some embodiments, the route refinement component 150 may enable the user to walk along the route to their destination while the AV is en route to the user. This can shorten the total AV trip length. When the AV is within some threshold (e.g., small) distance away, the user can be notified of the selected PU spot.

With respect to the fleet optimization component 130, as previously noted, the fleet optimization component 130 can scale up the single route optimization of transportation trips to optimize the transportation trip on a fleet-wide basis (e.g., reduce overall travel time on the fleet's network of AVs). For example, the fleet optimization component 130 can scale up the single AV route optimization to include all requested O/D pairs (from all of the self-driving car service users) in a given time window. Given an entire fleet of AVs and O/Ds for each user requesting a ride, the fleet optimization component 130 can optimize all trips together to reduce overall travel time on the network. In some cases, this may lead to individual users experiencing slightly longer trip-times, but can reduce the total travel time for the fleet, which is a fleet-level benefit. As such, the fleet optimization component 130 provides a routing algorithm that is socially optimal rather than "greedy."

In some embodiments, the fleet optimization component 130 adds additional factors to the route scores determined by the AV route optimization component 120. The additional factors may include the travel time of the other users of the self-driving car service having requested O/D pairs in the time window encompassing the requesting user. In this case, a user may sacrifice their individual travel time in order to minimize travel time of the fleet of AVs as a whole during the given time window.

In some embodiments, the fleet optimization component 130 may weigh different factors more or less depending on the overall fleet goals. For example, multiple facets of time may be considered for weighing factors, such as minimizing in-vehicle time, minimizing total time of all riders, maximizing monetization policies, prioritizing subscription model users, prioritizing multi-passenger vehicles, reducing traffic congestion, and so on. Depending on the particular fleet optimization policies, different weights may be applied to particular factors that are considered higher or lower priority for fleet optimization purposes.

In one example, in the case of reducing road congestion and minimizing overall fleet travel time, the fleet optimization component 130 may suggest a DO location for an individual user that avoids a traffic jam but causes the user to walk a further distance to reach the D location (and thus increases individual trip time for the user). In this case, the fleet optimization component 130 may cause the time of an individual user to be sacrificed in order to improve the overall performance of the fleet.

In some embodiments, the fleet optimization component 130 may additionally suggest a different mode of transportation (e.g., bus, subway, train, scooter, walking, etc.) to the user for their transportation trip. In some embodiments, the fleet optimization component 130 may take into consideration configured user preferences when determining the fleet-level route optimization. For example, the fleet optimization component 130 may suggest increased walking distances (and thus increase overall trip time) to those users indicating a preference or particular threshold for walking.

With respect to the system optimization component 140, as previously noted, the system optimization component 140 can expand the scope of the fleet-wide optimization to an entire system network of transportation (e.g., all transportation including the fleet network of AVs as well as other modes of transportation external to the fleet network). The system optimization component 140 can expand the route optimization to all transportation modes on the entire network (including and outside of the fleet network), making mode and route suggestions to a user that are not limited to the particular fleet services of the ride sharing car service. This entails suggesting a mode or combination of modes to a user that minimizes the user's travel time, subject to the constraint that it does not make system-level outcomes worse. A tangible example of this might be suggesting that a user walk instead of taking a vehicular mode for a short trip during a congested time of day.

A difference between the operations of the fleet optimization component 130 and the system optimization component 140 is the group of users for which aggregate travel time is being minimized. At the fleet level, the fleet optimization component 130 is constructing a bounding box around the fleet of AVs of the service (and their associated fleet users) and aiming to minimize the total time spent for all of the fleet's users, while also serving those users' trips. At the system level, the system optimization component 140 aims to minimize, based on what is known of the current state of traffic, all travel time and not just fleet user travel time.

In some embodiments, the system optimization component 140 can add additional factors to the route scores determined by the AV route optimization component 120 and/or the fleet optimization component 130. The additional factors may include the known traffic state of roads and/or other travel modes in the overall network. The system optimization component 140 can suggest a transportation mode and/or combination of modes to a user that minimizes the user's travel time, subject to the constraint that it does not make system-level outcomes worse.

For example, if a user is in a fleet vehicle and stuck in a traffic jam, the system optimization component 140 may suggest that the vehicle pull over early at a new location out of the traffic jam and suggest for the user to walk and/or take a different mode of transportation (e.g., bus) to arrive at the user's D location.

The system optimization component 140 may consider a user's profile when making system-level optimization suggestions. For example, a user may indicate in their profile that the user has a mass transit pass or prefers taking mass transit options into account when making routing decisions. The system optimization component 140 can consider this user information when weighing factors for route optimization at the system-level.

In some embodiments, route coordination system 110 may variably apply the fleet optimization component 130 and system optimization component 140 based on determined factors. For example, the fleet and/or system optimizations may be applied by the route coordination system 110 based on the time of data, area of driving, and so on.

FIG. 2 illustrates an example method 200 implementing single route optimization for transportation trips, in accordance with embodiments herein. Although the example method 200 depicts a particular sequence of operations, the sequence may be altered without departing from the scope of the disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some embodiments, the method 200 includes block 210 where identification of an origin (O) and destination (D) location pair (O/D pair) corresponding to a transportation trip request is received. In one embodiment, the transportation trip request is provided by a user of a self-driving car service. At block 220, N pickup (PU) locations and N drop-off (DO) locations are determined for the respective O location and D location of the O/D pair. In one embodiment, the N locations are within a determined radius of the respective O and D locations. The number of N locations may be based on a configuration setting of the self-driving car service.

Subsequently, at block 230, an origin walk duration is determined between each N PU location and the O location and a destination walk duration is determined between each N DO location and the D location. Then, at block 240, routes between all N PU locations and all N DO locations are determined, and an estimate of in-vehicle time for each route is determined. Lastly, at block 250, a route that minimizes a route score is selected. In one embodiment, the route score is based, at least, on a sum of the origin walk duration, the in-vehicle time, and destination walk duration.

FIG. 3 illustrates an example method 300 for implementing fleet-wide route optimization for transportation trips, in accordance with embodiments herein. Although the example method 300 depicts a particular sequence of operations, the sequence may be altered without departing from the scope of the disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some embodiments, the method 300 includes block 310 where potential routes for a transportation trip request are determined. In one embodiment, the potential routes include an origin/destination pair (O/D pair) having N pickup (PU) location options and N drop-off (DO) location options. Then, at block 320, all other O/D pairs of a fleet network of a fleet of AVs are determined. In one embodiment, the other O/D pairs are requested in a determined time window of the transportation trip request.

Subsequently, at block 330, a route score is determined for each potential route. In one embodiment, the route score is based on a sum of walk durations for the PU location options and DO location options and an in-vehicle time of the potential route. In one embodiment, the route score is also based on travel time corresponding to the other O/D pairs on the fleet network. Lastly, at block 340, a route is selected having a route score that minimizes an overall travel time on the fleet network.

FIG. 4 illustrates an example method 400 for implementing system-wide route optimization for transportation trips, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where potential routes for a transportation trip request are determined. In one embodiment, the potential routes include an O/D pair having N pickup (PU) location options and N drop-off (DO) location options. In one embodiment, the potential routes include one or more modes of transportation that are outside of a fleet network of a fleet of AVs. Then, at block 420, all other O/D pairs of a fleet network of a fleet of AVs are identified that are requested in a determined time window of the transportation trip request.

Subsequently, at block 430, a route score is determined for each potential route. In one embodiment, the route score is based on a sum of walk durations for the PU location options and DO location options and an in-vehicle time of the potential route, travel time corresponding to the other O/D pairs on the fleet network, and an overall travel time on a system-level network that includes transportation outside of the fleet network. Lastly, at block 440, a route is selected having a route score that does not increase the overall travel time on the system-level network.

Figure 5:
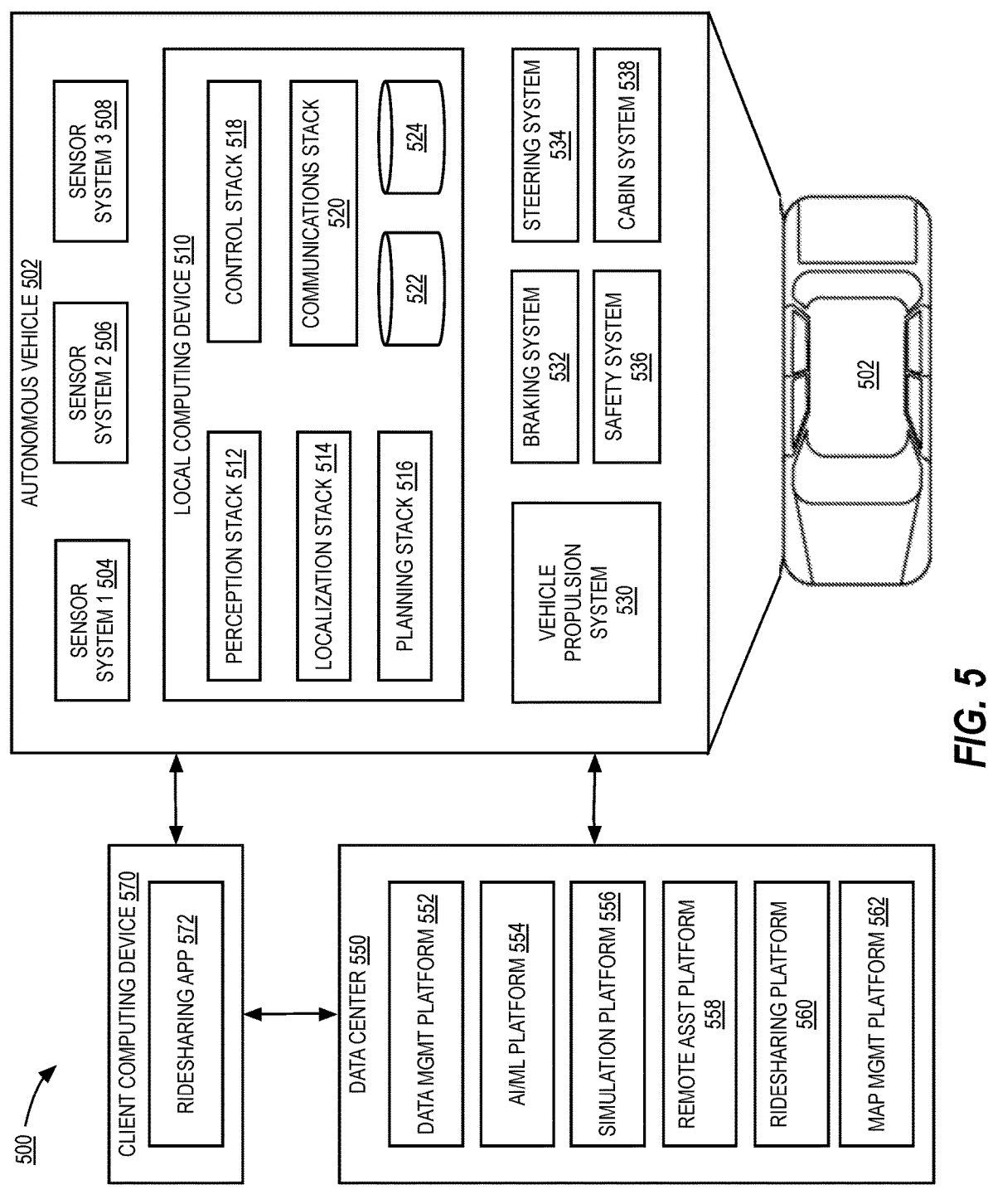
FIG. 5 illustrates an example system environment that can be used to facilitate AV dispatch and operations, according to some aspects of the disclosed technology.

Turning now to FIG. 5, this figure illustrates an example of an AV management system 500. In one embodiment, the AV management system 500 can implement a system-level optimization route and mode suggestion platform for transportation trips, as described further herein. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 502 can navigate about roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors.

AV 502 can also include several mechanical systems that can be used to maneuver or operate AV 502. For instance, the mechanical systems can include vehicle propulsion system 530, braking system 532, steering system 534, safety system 536, and cabin system 538, among other systems. Vehicle propulsion system 530 can include an electric motor, an internal combustion engine, or both. The braking system 532 can include an engine brake, a wheel braking system (e.g., a disc braking system that utilizes brake pads), hydraulics, actuators, and/or any other suitable componentry configured to assist in decelerating AV 502. The steering system 534 can include suitable componentry configured to control the direction of movement of the AV 502 during navigation. Safety system 536 can include lights and signal indicators, a parking brake, airbags, and so forth. The cabin system 538 can include cabin temperature control systems, in-cabin entertainment systems, and so forth. In some embodiments, the AV 502 may not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a planning stack 516, a control stack 518, a communications stack 520, a High Definition (HD) geospatial database 522, and an AV operational database 524, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 522, other components of the AV, and other data sources (e.g., the data center 550, the client computing device 570, third-party data sources, etc.). The perception stack 512 can detect and classify objects and determine their current and predicted locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth.

Mapping and localization stack 514 can determine the AV's position and orientation (pose) using different methods from multiple systems (e.g., GPS, IMUs, cameras, LIDAR, RADAR, ultrasonic sensors, the HD geospatial database 522, etc.). For example, in some embodiments, the AV 502 can compare sensor data captured in real-time by the sensor systems 504-508 to data in the HD geospatial database 522 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The planning stack 516 can determine how to maneuver or operate the AV 502 safely and efficiently in its environment. For example, the planning stack 516 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 502 from one point to another. The planning stack 516 can determine multiple sets of one or more mechanical operations that the AV 502 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 516 can select from multiple backup plans to carry out. For example, while preparing to change lanes to turn right at an intersection, another vehicle may aggressively cut into the destination lane, making the lane change unsafe. The planning stack 516 could have already determined an alternative plan for such an event, and upon its occurrence, help to direct the AV 502 to go around the block instead of blocking a current lane while waiting for an opening to change lanes.

The control stack 518 can manage the operation of the vehicle propulsion system 530, the braking system 532, the steering system 534, the safety system 536, and the cabin system 538. The control stack 518 can receive sensor signals from the sensor systems 504-508 as well as communicate with other stacks or components of the local computing device 510 or a remote system (e.g., the data center 550) to effectuate operation of the AV 502. For example, the control stack 518 can implement the final path or actions from the multiple paths or actions provided by the planning stack 516. This can involve turning the routes and decisions from the planning stack 516 into commands for the actuators that control the AV's steering, throttle, brake, and drive unit.

The communication stack 520 can transmit and receive signals between the various stacks and other components of the AV 502 and between the AV 502, the data center 550, the client computing device 570, and other remote systems. The communication stack 520 can enable the local computing device 510 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 520 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 522 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 524 can store raw AV data generated by the sensor systems 504-508 and other components of the AV 502 and/or data received by the AV 502 from remote systems (e.g., the data center 550, the client computing device 570, etc.). In some embodiments, the raw AV data can include HD LIDAR point cloud data, image or video data, RADAR data, GPS data, and other sensor data that the data center 550 can use for creating or updating AV geospatial data as discussed further below with respect to FIG. 5 and elsewhere in the present disclosure.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes one or more of a data management platform 552, an Artificial Intelligence/Machine Learning (AI/ML) platform 554, a simulation platform 556, a remote assistance platform 558, a ridesharing platform 560, and a map management platform 562, among other systems.

Data management platform 552 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management platform 562, and other platforms and systems. Using the AI/ML platform 554, data scientists can prepare data sets from the data management platform 552; select, design, and train machine learning models;

evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from the map management platform 562; modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to be picked up or dropped off from the ridesharing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
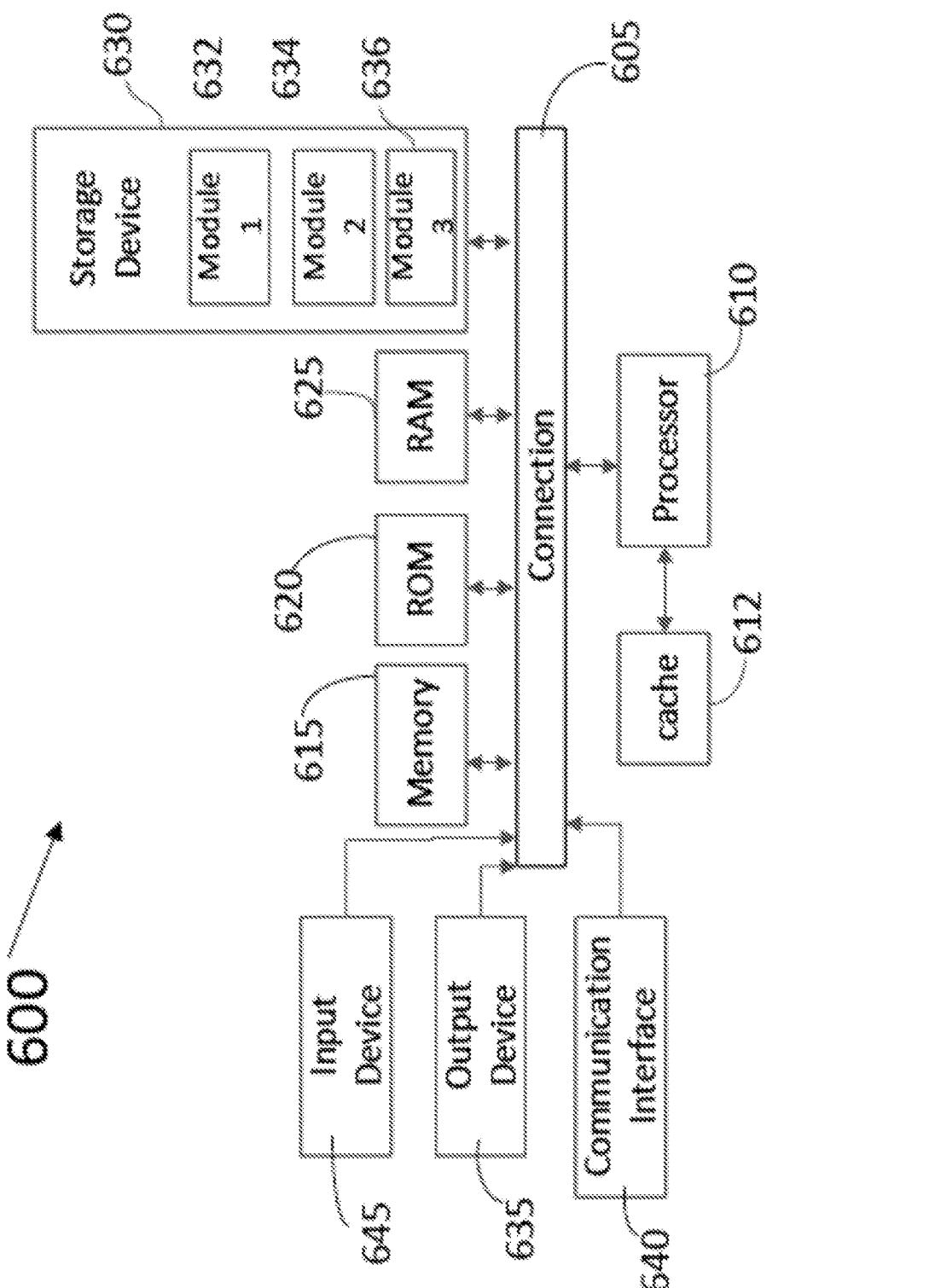
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the hardware components, such as processor 610, connection 605, output device 635, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions utilized in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a method for facilitating a system-level optimization route and mode suggestion platform for transportation trips, where the method comprises receiving, by a processing device, identification of an origin (O) location and a destination (D) location of an O/D pair corresponding to a transportation trip request of a user;

determining, by the processing device, N pickup (PU) locations for the O location and N drop-off (DO) locations for the D location; determining, by the processing device, an origin walk duration between each N PU locations and the O location and a destination walk duration between each N DO locations and the D location; routing, by the processing device, between the N PU locations and the N DO locations to determine an estimate of in-vehicle time for each route; and selecting, by the processing device, a route that minimizes a route score, wherein the route score is based on a sum of the origin walk duration, the in-vehicle time, and the destination walk duration.

In Example 2, the subject matter of Example 1 can optionally include wherein the N PU locations and the N DO locations are within a determined radius of the respective O location and D location and are identified as locations that an autonomous vehicle (AV) is capable of pulling over at, the AV to service the transportation trip request. In Example 3, the subject matter of any one of Examples 1-2 can optionally include wherein routing between all N PU locations and all N DO locations comprises taking a cartesian product of the N PU locations and the N DO locations to identify a set of all ordered pairs of the N PU location and the D DO locations.

In Example 4, the subject matter of any one of Examples 1-3 can optionally include wherein the route score further takes into consideration at least one of a difficulty of maneuvers performed along the route, a safety assessment of at least one of the PU location or the DO location, a time of day, or weather along the route. In Example 5, the subject matter of any one of Examples 1-4 can optionally include wherein the route score further takes into consideration user preferences of a user initiating the transportation trip request, the user preferences indicating at least one of a walking preference of the user related to walking distance or cost savings preference of the user related to costs.

In Example 6, the subject matter of any one of Examples 1-5 can optionally include further comprising repeating the routing and the selecting the route during a transportation trip of the transportation trip request in order to continuously minimize travel time for the user. In Example 7, the subject matter of any one of Examples 1-6 can optionally include wherein the route score further takes into consideration an entire fleet of autonomous vehicles (AVs) and O/D pairs for each user requesting a ride with the fleet of AVs by optimizing all routes of transportation trips together to reduce overall travel time on a network of the fleet of AVs.

In Example 8, the subject matter of any one of Examples 1-7 can optionally include wherein routing between the N PU locations and the N DO locations further comprises identifying different modes of transportation available along the route and selecting the route having one or more modes of transportation that minimizes a travel time of the user subject to a constraint that the route does not increase the overall travel time on a system-level network that comprises at least the network of the fleet and other transportation modes. In Example 9, the subject matter of any one of Examples 1-8 can optionally include wherein the different modes of transportation comprise at least one of a train, a subway, a bus, a scooter, walking, or any form of mass transit.

Example 10 includes an apparatus for facilitating a system-level optimization route and mode suggestion platform for transportation trips, the apparatus of Example 10 comprising one or more hardware processors to receive identification of an origin (O) location and a destination (D) location of an O/D pair corresponding to a transportation trip request of a user; determine N pickup (PU) locations for the O location and N drop-off (DO) locations for the D location; determine an origin walk duration between each N PU locations and the O location and a destination walk duration between each N DO locations and the D location; route between the N PU locations and the N DO locations to determine an estimate of in-vehicle time for each route; and select a route that minimizes a route score, wherein the route score is based on a sum of the origin walk duration, the in-vehicle time, and the destination walk duration.

In Example 11, the subject matter of Example 10 can optionally include wherein the N PU locations and the N DO locations are within a determined radius of the respective O location and D location and are identified as locations that an autonomous vehicle (AV) is capable of pulling over at, the AV to service the transportation trip request. In Example 12, the subject matter of Examples 10-11 can optionally include wherein routing between all N PU locations and all N DO locations comprises taking a cartesian product of the N PU locations and the N DO locations to identify a set of all ordered pairs of the N PU location and the D DO locations.

In Example 13, the subject matter of Examples 10-12 can optionally include wherein the route score further takes into consideration at least one of a difficulty of maneuvers performed along the route, a safety assessment of at least one of the PU location or the DO location, a time of day, or weather along the route. In Example 14, the subject matter of Examples 10-13 can optionally include wherein the route score further takes into consideration user preferences of a user initiating the transportation trip request, the user preferences indicating at least one of a walking preference of the user related to walking distance or cost savings preference of the user related to costs. In Example 15, the subject matter of Examples 10-14 can optionally include wherein the route score further takes into consideration an entire fleet of autonomous vehicles (AVs) and O/D pairs for each user requesting a ride with the fleet of AVs by optimizing all routes of transportation trips together to reduce overall travel time on a network of the fleet of AVs.

Example 16 is a non-transitory computer-readable storage medium for facilitating a system-level optimization route and mode suggestion platform for transportation trips. The non-transitory computer-readable storage medium of Example 16 having stored thereon executable computer program instructions that, when executed by one or more processors, cause the one or more processors to: receive identification of an origin (O) location and a destination (D) location of an O/D pair corresponding to a transportation trip request of a user; determine N pickup (PU) locations for the O location and N drop-off (DO) locations for the D location; determine an origin walk duration between each N PU locations and the O location and a destination walk duration between each N DO locations and the D location; route between the N PU locations and the N DO locations to determine an estimate of in-vehicle time for each route; and select a route that minimizes a route score, wherein the route score is based on a sum of the origin walk duration, the in-vehicle time, and the destination walk duration.

In Example 17, the subject matter of Example 16 can optionally include wherein the N PU locations and the N DO locations are within a determined radius of the respective O location and D location and are identified as locations that an autonomous vehicle (AV) is capable of pulling over at, the AV to service the transportation trip request. In Example 18, the subject matter of Examples 16-17 can optionally include wherein routing between all N PU locations and all N DO locations comprises taking a cartesian product of the N PU locations and the N DO locations to identify a set of all ordered pairs of the N PU location and the D DO locations.

In Example 19, the subject matter of Examples 16-18 can optionally include wherein the route score further takes into consideration at least one of a difficulty of maneuvers performed along the route, a safety assessment of at least one of the PU location or the DO location, a time of day, or weather along the route. In Example 20, the subject matter of Examples 16-19 can optionally include wherein the route score further takes into consideration an entire fleet of autonomous vehicles (AVs) and O/D pairs for each user requesting a ride with the fleet of AVs by optimizing all routes of transportation trips together to reduce overall travel time on a network of the fleet of AVs.

Example 21 is a system for facilitating a system-level optimization route and mode suggestion platform for transportation trips. The system of Example 21 can optionally include a memory to store a block of data, and one or more hardware processors to receive identification of an origin (O) location and a destination (D) location of an O/D pair corresponding to a transportation trip request of a user; determine N pickup (PU) locations for the O location and N drop-off (DO) locations for the D location; determine an origin walk duration between each N PU locations and the O location and a destination walk duration between each N DO locations and the D location; route between the N PU locations and the N DO locations to determine an estimate of in-vehicle time for each route; and select a route that minimizes a route score, wherein the route score is based on a sum of the origin walk duration, the in-vehicle time, and the destination walk duration.

In Example 22, the subject matter of Example 21 can optionally include wherein the N PU locations and the N DO locations are within a determined radius of the respective O location and D location and are identified as locations that an autonomous vehicle (AV) is capable of pulling over at, the AV to service the transportation trip request. In Example 23, the subject matter of Examples 21-22 can optionally include wherein routing between all N PU locations and all N DO locations comprises taking a cartesian product of the N PU locations and the N DO locations to identify a set of all ordered pairs of the N PU location and the D DO locations.

In Example 24, the subject matter of Examples 21-23 can optionally include wherein the route score further takes into consideration at least one of a difficulty of maneuvers performed along the route, a safety assessment of at least one of the PU location or the DO location, a time of day, or weather along the route. In Example 25, the subject matter of Examples 21-24 can optionally include wherein the route score further takes into consideration user preferences of a user initiating the transportation trip request, the user preferences indicating at least one of a walking preference of the user related to walking distance or cost savings preference of the user related to costs. In Example 26, the subject matter of Examples 21-25 can optionally include wherein the route score further takes into consideration an entire fleet of autonomous vehicles (AVs) and O/D pairs for each user requesting a ride with the fleet of AVs by optimizing all routes of transportation trips together to reduce overall travel time on a network of the fleet of AVs.

Example 27 includes an apparatus comprising means for performing the method of any of the Examples 1-9. Example 28 is at least one machine readable medium comprising a plurality of instructions that in response to being executed on a computing device, cause the computing device to carry out a method according to any one of Examples 1-9. Example 29 is an apparatus for facilitating a system-level optimization route and mode suggestion platform for transportation trips, configured to perform the method of any one of Examples 1-9. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
   receiving sensor data from one or more sensors disposed on an autonomous vehicle (AV);
   receiving, by a processing device, identification of an origin (O) location and a destination (D) location of an O/D pair corresponding to a transportation trip request of a user;
   determining, by the processing device, N pickup (PU) locations for the O location and N drop-off (DO) locations for the D location;
   determining a walking speed of the user based on the sensor data received from the AV;
   determining, by the processing device, an origin walk duration between each of the N PU locations and the O location and a destination walk duration between each of the N DO locations and the D location based on the walking speed of the user;
   routing, by the processing device, between the N PU locations and the N DO locations to determine an estimate of time for each route;
   selecting, by the processing device, a route that minimizes a route score, wherein the route score is based on a sum of the origin walk duration, the time, and the destination walk duration; and
   dispatching the AV to navigate to the PU location associated with the selected route to service the transportation trip request of the user.

2. The method of claim 1, wherein the N PU locations and the N DO locations are within a determined radius of the respective O location and D location and are identified as locations where the AV is capable of pulling over.

3. The method of claim 1, wherein routing between the N PU locations and the N DO locations comprises taking a Cartesian product of the N PU locations and the N DO locations to identify a set of all ordered pairs of the N PU locations and the N DO locations.

4. The method of claim 1, wherein the route score is further based on at least one of a difficulty of maneuvers performed along the route, a safety assessment of at least one of the PU location or the DO location, a time of day, or weather along the route.

5. The method of claim 1, wherein the route score is further based on user preferences of a user initiating the transportation trip request, the user preferences indicating at least one of a walking preference of the user related to walking distance or cost savings preference of the user related to costs.

6. The method of claim 1, further comprising repeating the routing and selecting the route during a transportation trip of the transportation trip request in order to continuously minimize travel time for the user.

7. The method of claim 1, wherein the route score is further based on an entire fleet of AVs and O/D pairs for each user requesting a ride with the fleet of AVs by optimizing all routes of transportation trips together to reduce overall travel time on a network of the fleet of AVs.

8. The method of claim 7, wherein routing between the N PU locations and the N DO locations further comprises identifying different modes of transportation available along the route and selecting the route having one or more modes of transportation that minimizes a travel time of the user subject to a constraint that the route does not increase the overall travel time on a system-level network that comprises at least the network of the fleet of AVs and other transportation modes.

9. The method of claim 8, wherein the different modes of transportation comprise at least one of a train, a subway, a bus, a scooter, or walking.

10. An apparatus comprising:
    one or more hardware processors to:
       receive sensor data from one or more sensors disposed on an autonomous vehicle (AV);
       receive identification of an origin (O) location and a destination (D) location of an O/D pair corresponding to a transportation trip request of a user;
       determine N pickup (PU) locations for the O location and N drop-off (DO) locations for the D location;
       determine a walking speed of the user based on the sensor data received from the AV;
       determine an origin walk duration between each of the N PU locations and the O location and a destination walk duration between each of the N DO locations and the D location based on the walking speed of the user;
       route between the N PU locations and the N DO locations to determine an estimate of time for each route;
       select a route that minimizes a route score, wherein the route score is based on a sum of the origin walk duration, the time, and the destination walk duration; and
       dispatch the AV to navigate to the PU location associated with the selected route to service the transportation trip request of the user.

11. The apparatus of claim 10, wherein the N PU locations and the N DO locations are within a determined radius of the respective O location and D location and are identified as locations where the AV is capable of pulling over.

12. The apparatus of claim 10, wherein routing between the N PU locations and the N DO locations comprises taking a Cartesian product of the N PU locations and the N DO locations to identify a set of all ordered pairs of the N PU locations and the N DO locations.

13. The apparatus of claim 10, wherein the route score is further based on at least one of a difficulty of maneuvers performed along the route, a safety assessment of at least one of the PU location or the DO location, a time of day, or weather along the route.

14. The apparatus of claim 10, wherein the route score is further based on user preferences of a user initiating the transportation trip request, the user preferences indicating at least one of a walking preference of the user related to walking distance or cost savings preference of the user related to costs.

15. The apparatus of claim 10, wherein the route score is further based on an entire fleet of AVs and O/D pairs for each user requesting a ride with the fleet of AVs by optimizing all routes of transportation trips together to reduce overall travel time on a network of the fleet of AVs.

16. A non-transitory computer-readable medium having stored thereon instructions that, when executed by one or more processors, cause the one or more processors to:

receive sensor data from one or more sensors disposed on an autonomous vehicle (AV);

receive identification of an origin (O) location and a destination (D) location of an O/D pair corresponding to a transportation trip request of a user;

determine N pickup (PU) locations for the O location and N drop-off (DO) locations for the D location;

determine a walking speed of the user based on the sensor data received from the AV;

determine an origin walk duration between each of the N PU locations and the O location and a destination walk duration between each of the N DO locations and the D location based on the walking speed of the user;

route between the N PU locations and the N DO locations to determine an estimate of in-vehicle time for each route;

select a route that minimizes a route score, wherein the route score is based on a sum of the origin walk duration, the time, and the destination walk duration; and dispatch the AV to navigate to the PU location associated with the selected route to service the transportation trip request of the user.

17. The non-transitory computer-readable medium of claim 16, wherein the N PU locations and the N DO locations are within a determined radius of the respective O location and D location and are identified as locations where the AV is capable of pulling over.

18. The non-transitory computer-readable medium of claim 16, wherein routing between the N PU locations and the N DO locations comprises taking a Cartesian product of the N PU locations and the N DO locations to identify a set of all ordered pairs of the N PU locations and the N DO locations.

19. The non-transitory computer-readable medium of claim 16, wherein the route score is further based on at least one of a difficulty of maneuvers performed along the route, a safety assessment of at least one of the PU location or the DO location, a time of day, or weather along the route.

20. The non-transitory computer-readable medium of claim 16, wherein the route score is further based on an entire fleet of AVs and O/D pairs for each user requesting a ride with the fleet of AVs by optimizing all routes of transportation trips together to reduce overall travel time on a network of the fleet of AVs.

* * * * *